No. 871,996. PATENTED NOV. 26, 1907.
J. JACOBSON & J. HAUGLAND.
MEASURING INSTRUMENT.
APPLICATION FILED MAY 21, 1907.
2 SHEETS—SHEET 1.
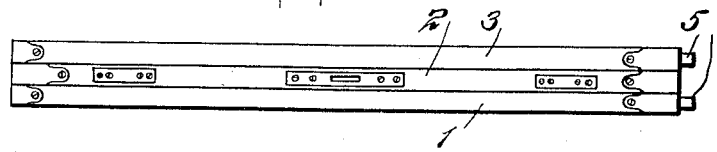
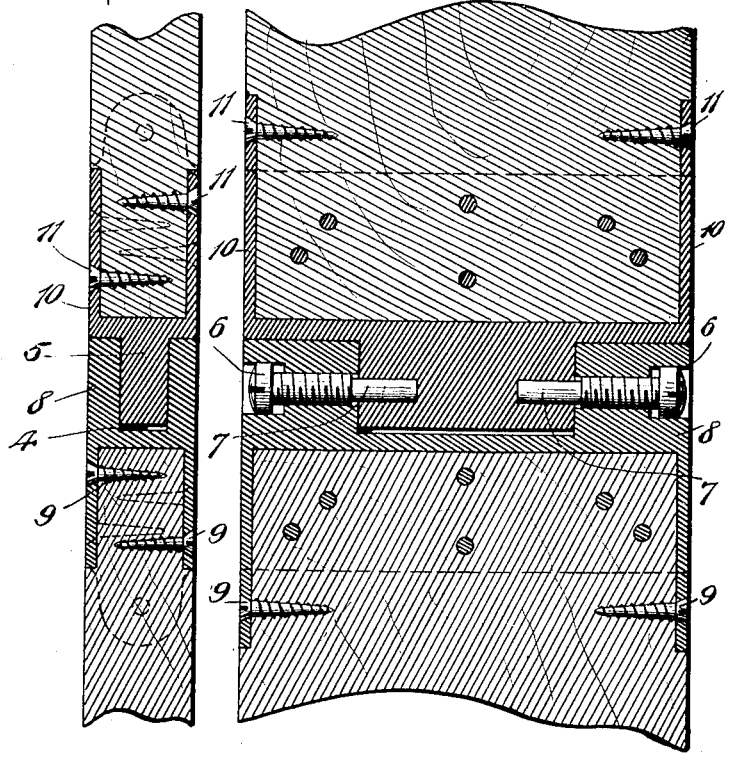
WITNESSES
INVENTORS
Jacob Jacobson
John Haugland
BY
ATTORNEY No. 871,996. PATENTED NOV. 26, 1907.
J. JACOBSON & J. HAUGLAND.
MEASURING INSTRUMENT.
APPLICATION FILED MAY 21, 1907.
2 SHEETS—SHEET 2.
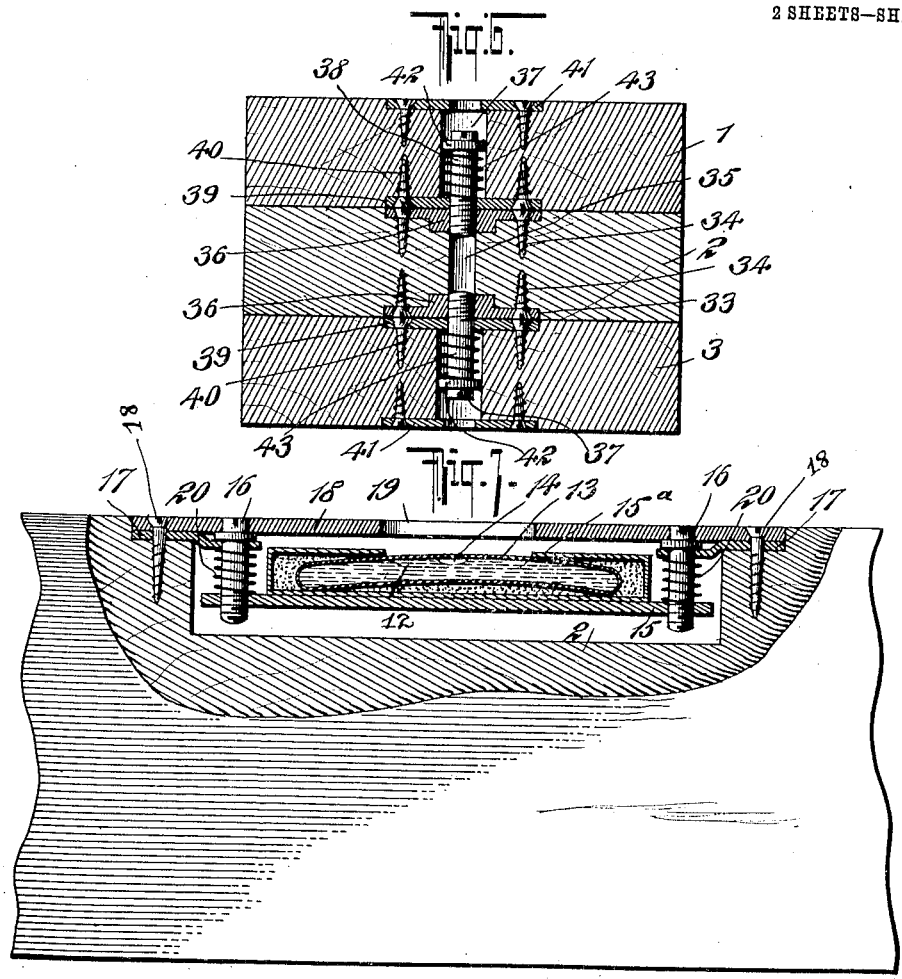
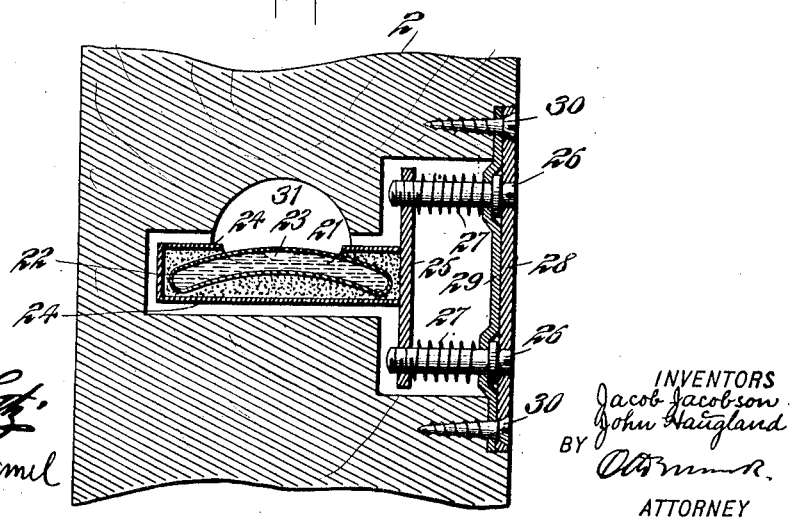
WITNESSES
INVENTORS
Jacob Jacobson
John Haugland
BY
ATTORNEY

UNITED STATES PATENT OFFICE.

JACOB JACOBSON AND JOHN HAUGLAND, OF BROOKLYN, NEW YORK.

MEASURING INSTRUMENT.

No. 871,996.

Specification of Letters Patent.

Patented Nov. 26, 1907.

Application filed May 21, 1907. Serial No. 374,884.

*To all whom it may concern:*

Be it known that we, JACOB JACOBSON, a citizen of the United States, and JOHN HAUGLAND, a subject of the King of Norway, both residing at Brooklyn, in the county of Kings and State of New York, have invented certain new and useful Improvements in Measuring Instruments, of which the following is a specification.

The present invention relates to a measuring instrument and embodies in its structure in extensible rule, a plumb and a level.

One object of the invention is the construction of a rule which is adjustable as to length enabling the same rule to be employed whether the measurements to be made are large or small.

A further object of the invention is to construct a rule of this character in separate sections which may be readily juxtaposed end to end and secured together in extended form, and as readily separated and superposed or laid side by side and thus secured together, occupying relatively little space when not in use.

Other objects and advantages of the invention will become apparent from the following specification and annexed drawings in which one embodiment of the invention is illustrated.

In the accompanying drawing wherein like reference characters refer to like parts throughout the several views:—Figure 1 is a side view of the rule when extended; Fig. 2 is an edge view of the same; Fig. 3 is an edge view of the rule illustrating the several sections as lying superposed and secured together; Fig. 4 is a vertical sectional view taken through the narrow part of the rule showing a mortise and tenon joint formed between the ends of rule sections; Fig. 5 is a view similar to Fig. 4 taken through the wide part of the rule; Fig. 6 is a vertical sectional view through three rule sections, and illustrates the manner of securing the same together; Fig. 7 is a vertical sectional view through the level; and Fig. 8 is a similar view through the plumb.

The instrument comprises a plurality of sections, three being illustrated in the drawing numbered respectively, 1, 2 and 3. The intermediate section 2 is provided with a mortise 4 at each end into which a tenon 5 formed on one end of each end section 1 and 3 is designed to enter. The tenons are firmly held in the mortise by means of screws 6 which passes through threaded apertures in the walls of the mortise and into bores formed at the side of each tenon. The lower end 7 of each screw 6 is preferably smooth, *i. e.* without a thread, to enable it to snugly fit in the bore in the tenon. The heads of the screws 6 are also preferably counter sunk, as shown in Fig. 5 so as to present no obstruction to the passage of a pencil or tool over the edge of the rule. The best method of forming the mortise and tenon joint above described is that illustrated in the drawing, wherein the mortise is cut out of a metal plate or block 8, secured by screws 9 to one of the rule sections and the tenon is formed from a similar metal plate or block 10 held by screws 11 to the rule sections.

In one of the rule sections, preferably the central section 2 we provide a level designated generally as 12, which is countersunk below the edge of the rule, as shown in Fig. 7. The preferred form of the level comprises a glass tubing 13 partially filled with liquid and designed to indicate by the bubble 14 whether or not the object measured by the instrument is perfectly level. The level is supported upon a plate 15 held by screws 16 which bear in brackets 17 and are held in place by screws 18 which pass through the brackets as well as through the covering plate 18 in which is provided an orifice 19 through which the level may be seen. The level is partially inclosed by a casing 15ª. Each of the screws 16 is surrounded by a coiled spring 20 which aids in adjusting the distance of the level 12 from the plate 18.

Fig. 8 is illustrative of a plumb which we place in one of the sections of the rule, also preferably the central section 2. The plumb is placed transversely in the section 2 and closely resembles the level above described, like it, comprising a glass tubing 21 partially filled with liquid 22 and adapted to indicate by a bubble 23 whether or not the object measured is straight.

It will be understood that the level is provided for the purposes of measuring horizontals and the plumb to measure perpendiculars. The tubing 21 is partially incased in a boxing 24 which is supported by a plate 25 adjustable upon the screws 26 which are encircled by coiled springs 27. The screws 26 pass through plates 28 and 29 which are held to the edge of the rim section by screws 30. A semicircular orifice 31 is formed in the rule section 2 to permit the operation of the plumb to be observed.

Referring to Fig. 6, the means employed for securing the several sections in superposed relation will now be described. In each of the upper and lower sides of one of the rule sections, preferably the intermediate section 2 we secure a plate 33 by screws 34, the section being bored at 35. Each plate 33 is provided with an extension 36 and is centrally bored and screw threaded. Each of the rule sections 1 and 3 has a central bore 37 in which is placed a screw 38 having the lower end of the shank threaded and the upper part thereof smooth. The threaded ends of the screws are designed to pass through plates 39 of uniform thickness, fastened at one side of the rule section by screws 40 over the bore holes. At the other side of each rule section is a second apertured plate 41 which acts to prevent the heads of the screws 38 from projecting over the edge of the rule section, each screw 38 being provided with a collar 42 which contacts with the plate 41 when the screw 38 is forced outwardly by a coiled spring 43 which surrounds the same. The screw 38 when forced downwardly by a screw driver or similar tool engages the threaded part of the plates 33 and thus secures the several sections together. When it is desired to separate the sections the screws 38 are turned until the springs 43 force the same outwardly and free of the intermediate section.

From the foregoing description it will be apparent that we have produced a simple and compact instrument, which may be cheaply manufactured, and is designed to avoid the necessity of separate instruments for different lengths to be measured.

It will of course be understood that we may employ more or less than three rule sections, and that three have been shown in the drawing merely for the purpose of clearly illustrating our invention.

Having thus described our invention, what we claim as new and desire to secure by Letters Patent is:—

1. In a measuring instrument of the class described, the combination with a series of independent rule sections, of a plumb and level mounted in one of said sections, means for securing said sections end to end, and means to secure said sections in superposed relation, said last named means comprising a bore passing entirely through one of said sections, an apertured screw threaded plate at each end of, and concentric with, said bore, and screws countersunk in the other of said sections and being adapted to engage the screw threaded plates.

2. In a measuring instrument of the class described, the combination with a series of rule sections, of means for securing said sections in superposed relation, said means comprising a bore passing entirely through one said section and an apertured screw threaded plate at each end of, and concentric with, said bore, and screws countersunk in the other said sections and being adapted to engage the screw threaded plates.

3. In a measuring instrument of the class described, the combination with a series of rule sections, of means for securing said sections in superposed relation, said means comprising a bore passing entirely through one said section and an apertured screw threaded plate at each end of, and concentric with said bore, and screws countersunk in the other said sections and being adapted to engage the screw threaded plates, each of said screws having the upper part of its shank smooth and the lower part thereof screw threaded.

4. In a measuring instrument of the class described, the combination with a series of rule sections, of means for securing said sections in superposed relation, said means comprising a bore passing entirely through one said section and an apertured screw threaded plate at each end of, and concentric with, said bore, and screws countersunk in the other said sections and being adapted to engage the screw threaded plates, each of said screws having the upper part of its shank smooth and the lower part thereof screw threaded, and a coiled spring surrounding each screw and being designed to prevent the same from projecting beyond the surface of its rule section when the said screw is not in engagement with the screw threaded plate.

In testimony whereof we have hereunto affixed our signatures in presence of two witnesses.

JACOB JACOBSON.
JOHN HAUGLAND.

Witnesses:
  ED. J. FANDREY,
  OSCAR BREVARD.